United States Patent
Jang et al.

(10) Patent No.: US 9,758,654 B2
(45) Date of Patent: Sep. 12, 2017

(54) POLYPROPYLENE RESIN COMPOSITION AND INTERIOR AND EXTERIOR MATERIALS FOR VEHICLES USING THE SAME

(71) Applicants: Hyundai Motor Company, Seoul (KR); Daeha Co., Ltd., Dangjin, Choongnam (KR)

(72) Inventors: Kyeong-Hoon Jang, Seoul (KR); Dae-Sik Kim, Gyeonggi-do (KR); Han-Ki Lee, Gyeonggi-do (KR); Hak-Soo Kim, Seoul (KR); Jung-Gyun Noh, Gyeonggi-do (KR); Tae-Sik Lee, Daegu (KR); Im-Taek Sung, Seoul (KR); Kyung-Beom Seo, Choongnam (KR)

(73) Assignees: Hyundai Motor Company, Seoul (KR); Daeha Co., Ltd., Dangjin, Chungnam (KR)

( * ) Notice: Subject to any disclaimer, the term of this patent is extended or adjusted under 35 U.S.C. 154(b) by 0 days.

(21) Appl. No.: 13/911,388

(22) Filed: Jun. 6, 2013

(65) Prior Publication Data

US 2014/0187694 A1 Jul. 3, 2014

(30) Foreign Application Priority Data

Dec. 27, 2012 (KR) ........................ 10-2012-0154552

(51) Int. Cl.
*C08L 23/12* (2006.01)
(52) U.S. Cl.
CPC .................................... *C08L 23/12* (2013.01)
(58) Field of Classification Search
CPC ...... C08L 23/12; C08L 23/0815; C08L 23/16; C08L 51/04; C08L 53/00; C08L 2205/025; C08L 2205/035

(Continued)

(56) References Cited

U.S. PATENT DOCUMENTS

2002/0013417 A1* 1/2002 Jung et al. .................... 525/240
2009/0280282 A1* 11/2009 Doty ........................ B32B 1/08
428/36.91

FOREIGN PATENT DOCUMENTS

CN 101100497 A * 1/2008
JP 2004010888 A 1/2004

(Continued)

OTHER PUBLICATIONS

KR 100608138 B1 (2006), machine translation, KIPO Korean Intellecutal Property Rights Information Service (KIPRIS).*

(Continued)

*Primary Examiner* — Josephine Chang
(74) *Attorney, Agent, or Firm* — Mintz Levin Cohn Ferris Glovsky and Popeo, P.C.; Peter F. Corless (57) ABSTRACT

A polypropylene resin composition, particularly, an olefin-based polypropylene resin composition includes: about 50 to 70% by weight of a high crystalline polypropylene; about 10 to 20% by weight of a reactor made thermoplastic polyolefin (RTPO) polypropylene; about 5 to 20% by weight of an inorganic filler; about 10 to 20% by weight of a rubber elastomer; and about 3% by weight or less of a slip agent, based on the total weight of the composition. The composition provides excellent physical properties such as high strength and impact resistance, and thus superior resistance to damage, and shows low gloss characteristics and excellent fluidity. The polypropylene resin composition is used as interior and exterior materials for vehicles.

2 Claims, 1 Drawing Sheet (58) Field of Classification Search
USPC .......................... 524/523, 423, 261, 504, 210
See application file for complete search history.

(56) References Cited

FOREIGN PATENT DOCUMENTS

| KR | 10-0608138 B1 | 8/2006 |
| KR | 10-2010-0044399 A | 4/2010 |

OTHER PUBLICATIONS

CN 101100497 A (2008), machine translation, Google Patents.*
Al-Juhani, A.A. et al., "Study of the Effect of EPDM Structure on the Compatibility of PP/LDPE Blends," Arab. J. Sci. Eng., No. 37, pp. 863-875 (published online Apr. 12, 2012).*

* cited by examiner

POLYPROPYLENE RESIN COMPOSITION AND INTERIOR AND EXTERIOR MATERIALS FOR VEHICLES USING THE SAME

CROSS-REFERENCE TO RELATED APPLICATIONS

The present application claims priority to Korean Patent Application No. 10-2012-0154552, filed on Dec. 27, 2012, the entire contents of which is incorporated herein for all purposes by this reference

BACKGROUND OF THE INVENTION

1. Field of the Invention

The present invention relates to a polypropylene resin composition, and more particularly, to an olefin-based polypropylene resin composition which is suitable for use in forming interior and exterior materials of a vehicle, such as an interior trim and the like, and interior and exterior materials for vehicles formed from the same. The polypropylene resin composition has excellent physical properties such as high strength, impact resistance and the like, and is thus superior in resistance to damage, and further shows low gloss characteristics and excellent fluidity.

2. Description of the Related Art

In response to pollution caused by the automobile industry, interest has increased in the development of more environmentally friendly and energy efficient vehicles. For example, many automobile companies are developing a technology for a more lightweight vehicle body that will improve fuel efficiency.

Currently, the ratio of materials used for a typical automobile is about 65% metal and about 13% plastics. As metal materials applied to the vehicle body are increasingly replaced with plastic materials for reducing the weight of the vehicle body, the market share of plastic materials is increasing.

In particular, among the plastic materials polypropylene occupies a market share of about 35%. Polypropylene is inexpensive prices and has excellent processability. In particular, polypropylene can be processed through easy injection molding. As such, the market share and use of polypropylene as automobile interior and exterior materials, such as a door trim, a bumper, a side molding and the like, are increasing, particularly through the application of a highly flowable polypropylene having high fluidity characteristics and appropriate content control thereof.

However, when polypropylene having high fluidity characteristics is used in order to impart high fluidity characteristics to a polypropylene material, there is a problem in that the mechanical strength (flexural modulus) and impact resistance of the material are reduced.

Accordingly, an inorganic filler has been used in order to supplement the mechanical strength. However, there is a disadvantage in this approach in that the specific weight of the material is increased by addition of the filler. For example, when rubber is used in order to supplement impact resistance, and an inorganic filler is used in order to supplement the mechanical strength which is reduced by the rubber, the specific weight of the material is increased.

Meanwhile, due to high gloss caused by the inherent crystallinity of a polypropylene material, when polypropylene is used in an interior material, such as an automobile interior trim and the like, there is a problem in that the visual fatigue degree of a driver is increased and the aesthetics of the vehicle deteriorate due to the peculiar surface gloss imparted by the polypropylene.

SUMMARY OF THE INVENTION

The present invention has been made in an effort to provide a polypropylene resin composition which secures high fluidity, high strength, high impact resistance and low gloss characteristics. The present invention provides such a polypropylene resin composition by controlling the composition thereof. Further, the present invention provides interior and exterior materials for vehicles formed using the polypropylene resin composition.

According to an aspect of the invention of the present invention, a polypropylene resin composition comprises generally: at least one high crystalline polypropylene, a reactor made of at least one thermoplastic material, at least one inorganic filler, at least one elastomeric material, and at least one slip agent. According to an exemplary embodiment, a polypropylene resin composition comprises: about 50 to 70% by weight of a high crystalline polypropylene; about 10 to 20% by weight of a reactor made thermoplastic polyolefin (RTPO) polypropylene; about 5 to 20% by weight of an inorganic filler; about 10 to 20% by weight of a rubber elastomer; and 3 about % by weight or less of a slip agent, based on the total weight of the composition.

According to various embodiments, the polypropylene resin composition further includes about 1 to 2% by weight of a modified polypropylene, particularly in which the polar group is grafted in an amount of about 1 to 2% by mole as an additive.

According to an exemplary embodiment, the high crystalline polypropylene is a mixture of a high crystalline polypropylene homo polymer (HCPP homo polymer) and a high crystalline polypropylene block copolymer (HCPP block copolymer). Preferably, the mixed weight ratio is preferably about 1 to 9:9 to 1 (HCPP homo polymer:HCPP block copolymer). The isotactic index of the HCPP homo polymer is preferably about 97% or more, and the melt index of the HCPP Homo Polymer is about 5 to 60 g/10 min (230° C., 2.16 kg), more preferably about 5 to 100 g/10 min (230° C., 2.16 kg). According to particularly preferred embodiments, the ratio of ethylene in the HCPP block copolymer to the weight of the HCPP block copolymer is about 2 to 12%.

According to an exemplary embodiment of the present invention, a rubber phase in the RTPO polypropylene is preferably about 30 to 40% by weight based on the weight of the RTPO polypropylene.

According to various embodiments of the present invention, the inorganic filler includes one or more selected from the group consisting of talc, glass bubble, magnesium, mica, magnesium hydroxide, silica, calcium sulfite, wollastonite, glass bead, glass fiber, potassium titanate fiber, calcium silicate fiber, calcium carbonate, white carbon, barium sulfate, calcium sulfate and whisker.

According to various embodiments of the present invention, the average particle diameter of the inorganic filler is about 3 to 50 μm.

According to various embodiments of the present invention, the rubber elastomer is a mixture of an ethylene-butene rubber (EBR) elastomer and a maleic anhydride grafted ethylene-propylene-diene rubber (EPDM-g-MA) elastomer. The melt index of the ethylene-butene rubber (EBR) elastomer is preferably about 1 to 15 g/10 min (190° C., 2.16 kg), and the content of butene is preferably about 8 to 28% by weight based on the weight of the ethylene-butene rubber (EBR) elastomer.

According to various embodiments of the present invention, the melt index of the maleic anhydride grafted ethylene-propylene-diene rubber (EPDM-g-MA) elastomer is about 1 to 15 g/10 min (230° C., 2.16 kg) and the specific weight thereof is about 0.86 to 0.90 g/cm$^3$. Preferably, the slip agent is a mixture of a siloxane-based slip agent and an amide-based slip agent and the mixed weight ratio thereof is preferably about 1 to 9:9 to 1.

According to an exemplary embodiment of the present invention, the siloxane is about 50 to 70% by weight based on the weight of the siloxane-based slip agent, and the amide is about 95.0 to 99.9% by weight based on the weight of the amide-based slip agent.

According to another aspect of the invention, the aforementioned polypropylene resin composition is applied to interior and exterior materials for vehicles.

The polypropylene resin composition of the present invention, having the aforementioned configuration, solves problems such as a short shot in molding and the like, which is generated by the use of a high fluidity material for the formation of thin and light weight automobile parts. The present invention further provides a polypropylene resin composition that secures both high fluidity and high rigidity simultaneously.

In addition, the polypropylene resin composition according to the present invention is advantageous in that excellent impact resistance caused by an increase in fluidity and rigidity is maintained. Further, low gloss characteristics are imparted. As such, the resin composition of the present invention may be suitably applied to interior and exterior materials of a vehicle, such as an interior filler trim, an interior door trim, an exterior bumper and the like.

Other features and aspects of the present invention will be apparent from the following detailed description, drawings and claims.

DETAILED DESCRIPTION OF THE EMBODIMENTS

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various modified examples, which may replace the configurations, are possible when filing the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present invention will be described in detail with reference to the accompanying drawings.

In an aspect, the present invention relates to a polypropylene resin composition.

According to an embodiment of the present invention, a polypropylene resin composition comprises about 50 to 70% by weight of a high crystalline polypropylene, about 10 to 20% by weight of an RTPO polypropylene; about 5 to 20% by weight of an inorganic filler; about 10 to 20% by weight of a rubber elastomer; and about 3% by weight or less (including 0 wt %) of a slip agent, based on the total weight of the composition. The slip agent may be excluded from the composition, but is preferably present in an amount of at least about 0.1 wt %, at least about 0.5 wt % or at least about 1 wt %. Each of these components will be described in further detail below.

(1) High Crystalline Polypropylene (HCPP)

The HCPP is a mixture of a high crystalline polypropylene homo polymer (HCPP homo polymer) and a high crystalline polypropylene block copolymer (HCPP block copolymer) as basic raw materials of the composition according to the present invention. According to preferred embodiments, the HCPP is included in an amount of about 50 to 70% by weight based on the total weight of the composition. If the HCPP is present in an amount less than about 50% by weight, it becomes difficult to impart mechanical strength and high fluidity characteristics. On the other hand, if the HCPP is present in an amount greater than about 70% by weight, impact resistance is reduced.

According to a preferred embodiment, the mixed weight ratio of the high crystalline polypropylene homo polymer to the high crystalline polypropylene block copolymer is preferably about 1 to 9:9 to 1. If the mixed weight ratio is less than about 1:9, a deviation in molding contraction ratio is increased. On the other hand, if the mixed weight ratio is more than about 9:1, there is less deviation in molding contraction ratio, but physical properties, such as rigidity and the like, deteriorate.

While the isotactic index of a polypropylene that is currently widely used is at the level of 94 to 97, the HCPP homo polymer of the present invention is preferably is a high crystalline polypropylene with an isotactic index of 97 or more. This is because a higher isotactic index corresponds to a higher the crystallinity. A resin composition including a high crystalline polypropylene with an isotactic index of 97 or more is more preferable for use in a general part, such as automobile interior and exterior materials and the like, and is advantageous in excellent rigidity and heat resistance, and the like.

According to embodiments of the present invention, the melt index of the HCPP homo polymer is preferably about 5 to 60 g/10 min (230° C., 2.16 kg). If the melt index is less than about 5 g/10 min (230° C., 2.16 kg), then the molding processability deteriorates. On the other hand, of the melt index is more than about 60 g/10 min (230° C., 2.16 kg), then mechanical strength, such as impact strength, rigidity and the like, is reduced which makes it difficult to use the material for automobile interior and exterior parts.

Further, the melt index of the HCPP block copolymer is preferably about 5 to 100 g/10 min (230° C., 2.16 kg). If the melt index is less than about 5 g/10 min (230° C., 2.16 kg), the moldability is insufficient. On the other hand, if the melt index is more than about 100 g/10 min (230° C., 2.16 kg), mechanical strength, such as impact strength of a polypropylene resin, and the like, is reduced.

According to preferred embodiments, the HCPP block copolymer is an ethylene-propylene copolymer. The weight of the ethylene is preferably about 2 to 12% based on the weight of the ethylene-propylene copolymer. If the weight of the ethylene is less than about 2% by weight, the impact strength of the polypropylene resin is decreased. On the other hand, if the weight of the ethylene is greater than about 12% by weight, while the impact strength is favorable, the rigidity is reduced.

(2) RTPO Polypropylene

The reactor made thermoplastic polyolefin (RTPO) polypropylene serves to improve the impact resistance and comprises a polypropylene including a reactive rubber phase. The RTPO is directly prepared in a reactor and is preferably included in an amount of about 10 to 20% by weight based on the total weight of the composition. If the RTPO is included at less than about 10% by weight, it may not adequately increase impact characteristics. On the other hand, if the RTPO is included at more than about 20% by weight, the mechanical strength is greatly reduced.

According to a preferred embodiment, in order to maximize impact characteristics, the rubber phase is preferably present in an amount of about 30 to 40% by weight based on the weight of the RTPO polypropylene.

(3) Inorganic Filler

The inorganic filler is added in order to improve the physical properties and molding processability of the polymer material, and the like. Preferably, the inorganic filler is included in an amount of about 5 to 20% by weight and preferably about 8 to 12% by weight based on the total weight of the composition. If the inorganic filler is added in an amount less than about 5% by weight, rigidity, and dimensional stability are decreased. On the other hand, if the inorganic filler is added in an amount greater than about 20% by weight, the weight of the product increases and scratch resistance is reduced due to excessive surface roughness.

Any conventional inorganic fillers may be used, and specifically, it is preferred that the inorganic filler includes one or more selected from the group consisting of talc, glass bubble, magnesium, mica, magnesium hydroxide, silica, calcium sulfite, wollastonite, glass bead, glass fiber, potassium titanate fiber, calcium silicate fiber, calcium carbonate, white carbon, barium sulfate, calcium sulfate and whisker. According to an exemplary embodiment, the inorganic filler includes a whisker.

According to various embodiments, the average particle diameter of the inorganic filler is preferably about 3 to 50 µm and more preferably about 2 to 8 µm, in order to prevent the reduction in smoothness and the increase in contraction ratio.

(4) Rubber Elastomer

The rubber elastomer is added in order to improve impact resistance and the like. According to various embodiments, the rubber elastomer is a mixture of an ethylene-butene rubber (EBR) elastomer and a maleic anhydride grafted ethylene-propylene-diene rubber (EPDM-g-MA) elastomer. Preferably, the rubber elastomer is included in an amount of about 10 to 20% by weight based on the total weight of the composition. If the rubber elastomer is added in an amount less than about 10% by weight, impact characteristics and low gloss characteristics may be reduced. On the other hand, if the rubber elastomer is added in an amount greater than about 20% by weight, strength characteristics are reduced.

In order to maximize the impact resistance improvement effects, it is preferred that the melt index of the ethylene-butene rubber (EBR) elastomer is about 1 to 15 g/10 min (190° C., 2.16 kg) and the content of butene is about 8 to 28% by weight based on the weight of the ethylene-butene rubber (EBR) elastomer. It is further preferred that the melt index of the maleic anhydride grafted ethylene-propylene-diene rubber (EPDM-g-MA) elastomer is about 1 to 15 g/10 min (230° C., 2.16 kg) and the specific weight thereof is about 0.86 to 0.90 g/cm$^3$.

(5) Slip Agent

The slip agent serves to improve scratch resistance by imparting slip properties to the surface thereof. According to various embodiments, the slip agent is a mixture of a siloxane-based slip agent as a master batch and an amide-based slip agent as a chemical additive. Preferably, the slip agent is any arbitrary component and is included in an amount of about 3% by weight or less and preferably about 1 to 2% by weight based on the total weight of the composition. If the amount of slip agent is greater than about 3% by weight, the overall physical properties are reduced and compatibility of polypropylene with other compositions is inhibited.

In order to maximize the slip property effects, it is preferred that a mixed weight ratio of a siloxane-based slip agent to a amide-based slip agent is about 1 to 9:9 to 1.

In order to improve scratch resistance efficiently, siloxane is preferably included in an amount of about 50 to 70% by weight and preferably about 65% by weight and sintered silica is included in an amount of preferably about 35% by weight, based on the total weight of the siloxane-based slip agent. Further, and amide is preferably included in an amount of about 95.0 to 99.9% by weight based on the weight of the amide-based slip agent.

(6) Additive

According to various embodiments, one or more additives, preferably a modified polypropylene additive, are added. According to an exemplary embodiment, a polypropylene additive is included in which the polar group is grafted in an amount of about 1 to 2% by mole. With such an additive, the usability and bonding property between polypropylene compositions are improved, and thus mutual affinity is increased and favorable effects on physical properties are demonstrated. It is preferred that the additive is included in an amount of about 1 to 2% by weight based on the total weight of the composition. In particular, such amounts of additives facilitate the bonding of the homo polypropylene, maleic anhydride and peroxide to each other, thereby exhibiting optimal effects in increasing the bonding property of polypropylene, inorganic filler and a stabilizer according to the action of amine-based polar groups.

According to another aspect, the present invention provides interior and exterior materials for vehicles using the polypropylene resin composition.

Specifically, the polypropylene resin composition according to the present invention may be applied to interior and exterior materials for vehicles to thereby simultaneously secure high fluidity, high strength, high impact resistance and low gloss characteristics.

The performance verification and physical property evaluation methods according to the present invention, which will be mentioned in the following Examples, are as follows.

(1) Melt index (MI, g/10 min)

An experiment was performed in accordance with ASTM D 1238 (230° C., 2.16 kg).

(2) Specific weight (g/μl)

An experiment was performed in accordance with ASTM D 792.

(3) Tensile strength and elongation at break (Kgf/cm$^2$)

An experiment was performed in accordance with ASTM D 638 (specimen thickness 3 mm, 23° C.).

(4) Flexural modulus and flexural strength (Kgf/cm$^2$)

An experiment was performed in accordance with ASTM D 790 (specimen thickness 6 mm, 23° C.).

(5) Impact strength (NOTCHED IZOD, Kgfcm/cm)

An experiment was performed in accordance with ASTM D 256 (specimen thickness 6 mm, 23° C.).

(6) Heat distortion temperature (° C.)

An experiment was performed in accordance with ASTM D 648 (4.6 kg load, specimen thickness 6 mm).

(7) Scratch resistance: After an experiment was performed under conditions of the following Table 1 by using a sapphire scratch tip of FIG. 1, the surface state was determined by the following Table 2.

TABLE 1

Figure 1:
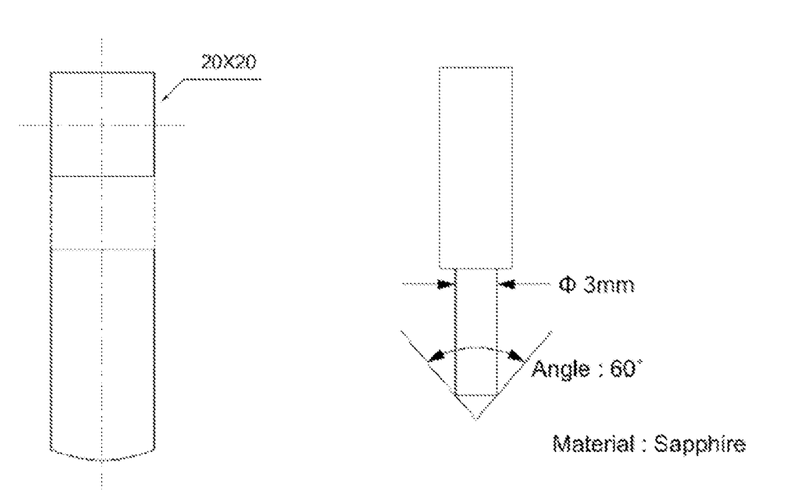
FIG. 1 is a view illustrating a sapphire scratch tip which was utilized to measure scratch resistance in the Examples.

| Item | Conditions |
|---|---|
| Load (Kgf) | 0.5 (including the scratch tip weight) |
| Stroke (mm) | 100 ± 5 |
| Scratch speed (mm/sec) | 100 |
| Scratch tip | See FIG. 1 |
| Number of scratches | Once |

TABLE 2

| | Criteria for determination | |
|---|---|---|
| Magnitude | Scratch width (μm) | Appearance |
| 5 | <20 | Almost no surface damage |
| 4 | 100 to 200 | Obvious surface damage is not recognized |
| 3 | 200 to 300 | Minute surface damage is recognized |
| 2 | 300 to 400 | Whitening is caused by obvious surface damage |
| 1 | >400 | Very severe surface damage |

(8) Degree of gloss

An experiment was performed on an embossed surface composed of a predetermined pattern in accordance with ASTM D 523 (incident angle 60°).

Hereinafter, the present invention will be described in more detail through Examples. These Examples are only for illustrating the present invention, and it will be obvious to those skilled in the art that the scope of the present invention is not interpreted to be limited by these Examples.

EXAMPLE 1

For selecting an RTPO polypropylene and a high crystalline polypropylene (HCPP homo polymer, HCPP block copolymer), basic physical properties were measured and the results thereof are shown in the following Tables 3 to 5.

TABLE 3

| | | Example (R-TPO) | | | |
|---|---|---|---|---|---|
| Test item | | Polypropylene-1 | Polypropylene-2 | Polypropylene-3 | Polypropylene-4 |
| Melt index | g/10 min | 0.6 | 2.5 | 13 | 20 |
| Specific weight | g/cm$^3$ | 0.90 | 0.90 | 0.90 | 0.90 |
| Tensile strength | kgf/cm$^2$ | 110 | 120 | 200 | 170 |
| Elongation at break | % | 600 | 40 | 300 | 300 |
| Flexural modulus | kgf/cm$^2$ | 3,400 | 4,200 | 10,000 | 7,300 |
| IZOD Impact strength (23° C.) | kgfcm/cm | N.B | N.B | N.B | N.B |
| IZOD Impact strength (−10° C.) | kgfcm/cm | 8 | 9.5 | 9.0 | 11.0 |
| Heat distortion temperature | ° C. | 65 | 70 | 100 | 100 |
| Scratch resistance | — | Magnitude 3 | Magnitude 3 | Magnitude 3 | Magnitude 3 |
| Degree of gloss | ASTM D523 (incident angle 60°) | 3.6 | 3.2 | 3.4 | 2.5 |

TABLE 4

| Test item | | Example (High Crystalline Resin Homo Polymer) | | | |
|---|---|---|---|---|---|
| | | Polypropylene-5 | Polypropylene-6 | Polypropylene-7 | Polypropylene-8 |
| Melt index | g/10 min | 41 | 42 | 43 | 60 |
| Specific weight | g/cm$^3$ | 0.90 | 0.91 | 0.91 | 0.91 |
| Tensile strength | kgf/cm$^2$ | 362 | 420 | 425 | 410 |
| Elongation at break | % | 34 | 26 | 15 | 15 |
| Flexural modulus | kgf/cm$^2$ | 18,100 | 26,500 | 22,800 | 23,900 |
| IZOD Impact strength (23° C.) | kgfcm/cm | 2.0 | 2.1 | 2.0 | 1.8 |
| IZOD Impact strength (−10° C.) | kgfcm/cm | 1.9 | 1.2 | 1.2 | 1.0 |
| Heat distortion temperature | ° C. | 120 | 150 | 140 | 140 |
| Scratch resistance | — | Magnitude 3 | Magnitude 3 | Magnitude 3 | Magnitude 3 |
| Degree of gloss | ASTM D523 (incident angle 60°) | 3.1 | 3.2 | 3.8 | 4.1 |

TABLE 5

| Test item | | Example (High Crystalline Resin Block Polymer) | | | |
|---|---|---|---|---|---|
| | | Polypropylene-9 | Polypropylene-10 | Polypropylene-11 | Polypropylene-12 |
| Melt index | g/10 min | 28 | 29 | 56 | 95 |
| Specific weight | g/cm$^3$ | 0.91 | 0.90 | 0.90 | 0.90 |
| Tensile strength | kgf/cm$^2$ | 320 | 310 | 305 | 320 |
| Elongation at break | % | 110 | 150 | 80 | 35 |
| Flexural modulus | kgf/cm$^2$ | 20,000 | 18,500 | 18,600 | 18,600 |
| IZOD Impact strength (23° C.) | kgfcm/cm | 9.0 | 8.5 | 7.0 | 6.5 |
| IZOD Impact strength (−10° C.) | kgfcm/cm | 4.0 | 4.5 | 4.5 | 3.5 |
| Heat distortion temperature | ° C. | 140 | 135 | 138 | 140 |
| Scratch resistance | — | Magnitude 3 | Magnitude 3 | Magnitude 3 | Magnitude 3 |
| Degree of gloss | ASTM D523 (incident angle 60°) | 3.8 | 3.6 | 3.8 | 3.6 |

As a result of measuring the polypropylene physical properties in Tables 3 to 5, polypropylene-6, polypropylene-12 and polypropylene-4 were selected in order to impart high rigidity, high fluidity, and impact resistance characteristics and low gloss characteristics, respectively.

EXAMPLE 2

Experiments for determining the appropriate compositions of the polypropylene resin, rubber elastomer, slip agent, and other stabilizers, which were selected in Example 1, were performed, and the results thereof are shown in Tables 6 and 7.

TABLE 6

| Composition | Example | | | | |
|---|---|---|---|---|---|
| | A-1 | A-2 | A-3 | A-4 | A-5 |
| Polypropylene-4 | 70 | 70 | 70 | 70 | 70 |
| EBR | 20 | 15 | 10 | 5 | 0 |
| EPDM-g-MA | 0 | 5 | 10 | 15 | 20 |
| Whisker | 5 | 5 | 5 | 5 | 5 |
| Slip agent | 2 | 2 | 2 | 2 | 2 |
| Modified PP-g-MA | 1 | 1 | 1 | 1 | 1 |
| Other additives | <2 | <2 | <2 | <2 | <2 |

TABLE 7

| Test item | | | Example | | | | |
|---|---|---|---|---|---|---|---|
| | | | A-1 | A-2 | A-3 | A-4 | A-5 |
| Melt index | g/10 min | 35↑ | 21.8 | 18.4 | 15.3 | 13.1 | 10.9 |
| Specific weight | g/cm$^3$ | 0.95↓ | 0.9379 | 0.9383 | 0.9382 | 0.9384 | 0.9384 |
| Tensile strength | kgf/cm$^2$ | 255↓ | 101.4 | 102.6 | 104.1 | 107.7 | 110.0 |
| Elongation at break | % | 100↓ | >400 | >400 | >400 | >400 | >400 |
| Flexural modulus | kgf/cm$^2$ | 14,200↑ | 5,482 | 5,490 | 5,537 | 5,571 | 5,605 |
| IZOD Impact strength (23° C.) | kgfcm/cm | 5.9↑ | N.B | N.B | N.B | N.B | N.B |
| Heat distortion temperature | ° C. | 100↑ | 98.7 | 99.5 | 101.7 | 103.8 | 104.4 |
| Scratch resistance | — | | Magnitude 3 | Magnitude 3 | Magnitude 3 | Magnitude 3 | Magnitude 3 |
| Degree of gloss | ASTM D523 (incident angle 60°) | 1.2↓ | 1.6 | 1.5 | 1.3 | 1.0 | 0.8 |

Table 6 is a table that shows the compositions of the polypropylene resin composition, and Table 7 is a table that shows the results of measuring the physical properties of each composition, and it was confirmed that mechanical characteristics and thermal characteristics were significantly reduced as shown in the Tables.

EXAMPLE 3

In order to supplement the reduction in mechanical characteristics and thermal characteristics, the HCPP homo polymer was added to A-4 and A-5 compositions in the Examples.

That is, in order to find an appropriate composition in which mechanical characteristics and thermal characteristics were improved while elongation and impact characteristics were also maintained, the composition ratio of the compositions was controlled, and the composition and evaluation results are shown in the following Tables 8 and 9.

As a result of considering mechanical characteristics, impact characteristics and gloss characteristics, it was determined that the A-4 and A-5 compositions were particularly favorable.

TABLE 8

| Composition | Example | | | | | |
|---|---|---|---|---|---|---|
| | B-1 | B-2 | B-3 | B-4 | B-5 | B-6 |
| Polypropylene-4 | 10 | 20 | 30 | 10 | 20 | 30 |
| Polypropylene-6 | 60 | 50 | 40 | 60 | 50 | 40 |
| RBR | 5 | 5 | 5 | 0 | 0 | 0 |
| EPDM-g-MA | 15 | 15 | 15 | 20 | 20 | 20 |
| Whisker | 5 | 5 | 5 | 5 | 5 | 5 |
| Slip agent | 2 | 2 | 2 | 2 | 2 | 2 |
| Modified PP-g-MA | 1 | 1 | 1 | 1 | 1 | 1 |
| Other additives | <2 | <2 | <2 | <2 | <2 | <2 |

TABLE 9

| Test item | | | Example | | | | | |
|---|---|---|---|---|---|---|---|---|
| | | | B-1 | B-2 | B-3 | B-4 | B-5 | B-6 |
| Melt index | g/10 min | 35↑ | 26.8 | 25.2 | 23.7 | 23.9 | 22.5 | 21.2 |
| Specific weight | g/cm$^3$ | 0.95↓ | 0.9424 | 0.9467 | 0.9455 | 0.9442 | 0.9446 | 0.9461 |
| Tensile strength | kgf/cm$^2$ | 255↓ | 268.4 | 259.7 | 244.0 | 277.9 | 263.3 | 251.8 |
| Elongation at break | % | 100↓ | 136.1 | 156.0 | 188.2 | 105.7 | 118.4 | 133.8 |
| Flexural modulus | kgf/cm$^2$ | 14,200↑ | 17,413 | 16,603 | 15,853 | 17,633 | 16,827 | 16,210 |
| IZOD Impact strength (23° C.) | kgfcm/cm | 5.9↑ | 15.3 | 18.0 | 19.2 | 13.0 | 14.5 | 16.7 |
| Heat distortion temperature | ° C. | 100↑ | 126.7 | 121.4 | 118.6 | 127.2 | 123.3 | 119.5 |
| Scratch resistance | — | | Magnitude 3 | Magnitude 3 | Magnitude 3 | Magnitude 3 | Magnitude 3 | Magnitude 3 |
| Degree of gloss | ASTM D523 (incident angle 60°) | 1.2↓ | 1.1 | 1.1 | 1.0 | 1.1 | 1.0 | 1.0 |

Table 8 is a table that shows the composition of a polypropylene resin composition in which the HCPP homo polymer was added, and Table 9 is a table that shows the results of measuring the physical properties of each composition. As a result of applying the HCPP homo polymer as shown in the Table, the impact strength and elongation characteristics were slightly reduced, but the criteria for the test items were satisfied and the tensile strength and heat distortion temperature were improved. However, the melt index was below a required level.

EXAMPLE 4

In order to improve the melt index while satisfying the current criteria for the items, a high crystalline block copolymer polypropylene with a high melt index was applied to the B-1 composition.

That is, in order to find a composition that satisfied the melt index and all the physical properties, the composition ratio was controlled, and the composition and evaluation results are shown in the following Tables 10 and 11.

TABLE 10

| Composition | Example | | | | |
| --- | --- | --- | --- | --- | --- |
| | C-1 | C-2 | C-3 | C-4 | C-5 |
| Polypropylene-4 | 10 | 10 | 10 | 10 | 10 |
| Polypropylene-6 | 50 | 40 | 30 | 20 | 10 |
| Polypropylene-12 | 10 | 20 | 30 | 40 | 50 |
| EBR | 5 | 5 | 5 | 5 | 5 |
| EPDM-g-MA | 15 | 15 | 15 | 15 | 15 |
| Whisker | 5 | 5 | 5 | 5 | 5 |
| Slip agent | 2 | 2 | 2 | 2 | 2 |
| Modified PP-g-MA | 1 | 1 | 1 | 1 | 1 |
| Other additives | <2 | <2 | <2 | <2 | <2 |

TABLE 11

| Test item | | | Example | | | | |
| --- | --- | --- | --- | --- | --- | --- | --- |
| | | | C-1 | C-2 | C-3 | C-4 | C-5 |
| Melt index | g/10 min | 35↑ | 31.7 | 32.84 | 34.09 | 38.56 | 40.11 |
| Specific weight | g/cm$^3$ | 0.95↓ | 0.9467 | 0.9459 | 0.9462 | 0.9471 | 0.9460 |
| Tensile strength | kgf/cm$^2$ | 255↓ | 265.3 | 262.5 | 258.7 | 256.1 | 252.8 |
| Elongation at break | % | 100↓ | 86.5 | 92.7 | 98.3 | 105.2 | 110.7 |
| Flexural modulus | kgf/cm$^2$ | 14,200↑ | 15,952 | 15,577 | 14,960 | 14,588 | 14,060 |
| IZOD Impact strength (23° C.) | kgfcm/cm | 5.9↑ | 8.9 | 9.3 | 10.3 | 11.0 | 11.3 |
| Heat distortion temperature | ° C. | 100↑ | 120.5 | 119.8 | 119.2 | 119.6 | 118.9 |
| Scratch resistance | — | Magnitude 3 | Magnitude 3 | Magnitude 3 | Magnitude 3 | Magnitude 3 | Magnitude 3 |
| Degree of gloss | ASTM D523 (incident angle 60°) | 1.2↓ | 1.1 | 1.1 | 1.1 | 1.1 | 1.1 |

Table 10 is a table that shows the composition of a polypropylene resin composition in which the HCPP block copolymer was added, and Table 11 is a table that shows the result of measuring the physical properties of each composition.

As shown in the Table, the C-1 to C-3 compositions satisfied mechanical characteristics, impact characteristics and thermal characteristics. However, these compositions were not appropriate for imparting elongation and melt index characteristics. Furthermore, the C-5 composition had excellent fluidity, but mechanical characteristics were slightly insufficient.

On the contrary, the C-4 composition showed results that satisfied high rigidity of 14,000 kgf/cm$^2$ or more, high fluidity of 35 g/10 min or more, an impact resistance of 5.9 kgf/cm2 or more and a low gloss characteristic of magnitude 1.2 or less.

That is, as the C-4 composition was in accordance with the composition ratio according to the present invention. This composition was favorable to the molding of injection product whose thickness is made thinner due to the recent requirements of lightweight products having high fluidity characteristics. Further, this composition had a characteristic of supplementing the reduction in mechanical strength that occurs when a material with a high fluidity is used, as a high rigidity polypropylene resin. Further, inherent impact characteristics of an interior filler trim and hardness of a plastic material were alleviated by applying the RTPO polypropylene. Further, a rubber elastomer was added to provide a product that exhibited the high quality requirements of an automobile plastic interior product having necessary impact resistance and low gloss effects.

As described above, the present invention has been described in relation to specific embodiments of the present invention, but this is only illustration and the present invention is not limited thereto. Embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A polypropylene resin composition, comprising:
   about 50 to 70% by weight of a high crystalline polypropylene;
   about 10 to 20% by weight of a reactor made thermoplastic polyolefin (RTPO) polypropylene;
   about 5 to 20% by weight of an inorganic filler;

about 10 to 20% by weight of a rubber elastomer;
about 1 to 3% by weight of a slip agent, and
about 1 to 2% by weight of a modified polypropylene in which a polar group is grafted in an amount of about 1 to 2% by mole as an additive,
wherein % by weight is based on a total weight of the polypropylene resin composition,
wherein the rubber elastomer is a mixture of an ethylene-butene rubber (EBR) elastomer and a maleic anhydride grafted ethylene-propylene-diene rubber (EPDM-g-MA) elastomer,
wherein a melt index of the ethylene-butene rubber (EBR) elastomer is about 1 to 15 g/10 min (190° C., 2.16 kg), and a content of butene is about 8 to 28% by weight based on the weight of the ethylene-butene rubber (EBR) elastomer,
wherein a melt index of the maleic anhydride grafted ethylene-propylene-diene rubber (EPDM-g-MA) elastomer is about 1 to 15 g/10 min (230° C., 2.16 kg) and a specific weight thereof is about 0.86 to 0.90 g/cm$^3$,
wherein the slip agent is a mixture of a siloxane-based slip agent and an amide-based slip agent, and a mixed weight ratio thereof is about 1 to 9:9 to 1,
wherein the high crystalline polypropylene is a mixture of a high crystalline polypropylene homo polymer (HCPP homo polymer) and a high crystalline polypropylene block copolymer (HCPP block copolymer) and a mixed weight ratio thereof is from about (1: values exceeding 1 but not including 1) to (1: values never exceeding 5 but not including 5),
wherein a melt index of the HCPP homo polymer is about 5 to 60 g/10 min (230° C., 2.16 kg) and a melt index of the HCPP block copolymer is about 5 to 100 g/10 min (230° C., 2.16 kg),
wherein a rubber phase in the RTPO polypropylene is about 30 to 40% by weight based on the total weight of the RTPO polypropylene,
wherein an isotactic index of the HCPP homo polymer is greater than about 97%,
wherein a ratio of ethylene in the HCPP block copolymer to the weight of the HCPP block copolymer is about 2 to 12%,
wherein the inorganic filler comprises one or more selected from the group consisting of talc, glass bubble, magnesium, mica, magnesium hydroxide, silica, calcium sulfite, wollastonite, glass bead, glass fiber, potassium titanate fiber, calcium silicate fiber, calcium carbonate, white carbon, barium sulfate, calcium sulfate and whisker,
wherein an average particle diameter of the inorganic filler is about 3 to 50 pm, and
wherein siloxane is about 50 to 70% by weight based on the weight of the siloxane-based slip agent and amide is about 95.0 to 99.9% by weight based on the weight of the amide-based slip agent.

2. An interior and exterior material for vehicles, to which the polypropylene resin composition of claim 1 is applied.

* * * * *